United States Patent [19]
Larkin et al.

[11] Patent Number: 5,642,617
[45] Date of Patent: Jul. 1, 1997

[54] CONTINUOUSLY VARIABLE HYDROSTATIC TRANSMISSION WITH NEUTRAL-SETTING HYDRAULIC CIRCUIT

[75] Inventors: Robert Francis Larkin; Donald Mark Purcell, both of Pittsfield, Mass.

[73] Assignee: Martin Marietta Corporation, Bethesda, Md.

[21] Appl. No.: 543,545

[22] Filed: Oct. 16, 1995

[51] Int. Cl.$^6$ ............................................. F16D 39/00
[52] U.S. Cl. ...................... 60/488; 60/489; 60/492
[58] Field of Search ............................ 60/488, 489, 490, 60/491, 492

[56] References Cited

U.S. PATENT DOCUMENTS

| | | | |
|---|---|---|---|
| 3,131,540 | 5/1964 | Ritter | 60/488 X |
| 3,906,727 | 9/1975 | Hull | 60/489 X |
| 5,486,142 | 1/1996 | Folsom | 60/492 X |
| 5,493,862 | 2/1996 | Folsom | 60/492 X |
| 5,524,437 | 6/1996 | Larkin et al. | 60/492 |
| 5,531,072 | 7/1996 | Larkin | 60/491 X |
| 5,540,048 | 7/1996 | Larkin et al. | 60/492 X |

*Primary Examiner*—F. Daniel Lopez
*Attorney, Agent, or Firm*—Robert A. Cahill; Geoffrey H. Krauss

[57] ABSTRACT

A continuously variable hydrostatic transmission includes axially aligned input and output shafts journaled by a transmission housing and respectively coupled to a prime mover and a load. The input shaft drives a hydraulic pump unit, while a hydraulic motor unit is grounded to the transmission housing. A wedge-shaped swashplate is pivotally connected to the output shaft in operative position to accommodate pressurized hydraulic fluid exchanges between the pump and motor units. A controller is coupled to adjust the angular orientation of the swashplate relative to the output shaft axis and thus set the transmission ratio. A hydraulic circuit, connected into the hydraulic motor unit, is selectively operable to vent high and low fluid pressure sides of the swashplate to atmosphere, thus imposing a neutral transmission ratio condition regardless of the transmission ratio set by the controller.

8 Claims, 2 Drawing Sheets

CONTINUOUSLY VARIABLE HYDROSTATIC TRANSMISSION WITH NEUTRAL-SETTING HYDRAULIC CIRCUIT

REFERENCE TO RELATED APPLICATIONS

The invention disclosed in this application has particular, but not necessarily limited, application to the continuously variable hydrostatic transmissions disclosed in Folsom, U.S. Pat. No. 5,423,183; and Folsom, U.S. patent applications Ser. Nos. 08/333,688, filed Nov. 3, 1994, and 08/342,472, filed Nov. 21, 1994. The disclosures of these U.S. patent and U.S. patent applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In the above-cited U.S. patent and U.S. patent applications, a hydraulic machine is disclosed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is pivotally connected to the swashplate in torque coupled relation. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio, is continuously variable, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio, such that maximum flow rate occurs at the highest transmission ratio setting, the flow rate in the hydraulic machines disclosed in the cited U.S. patent and U.S. patent applications reaches a maximum at a midpoint in the ratio range and then progressively decreases to essentially zero at a 1:1 transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machines of the cited U.S. patent and U.S. patent application have a particularly advantageous application as a highly efficient, quiet, continuously variable hydrostatic transmission in vehicular drivetrains.

SUMMARY OF THE INVENTION

It is an objective of the present invention to provide improvements in continuously variable hydrostatic transmissions of the type disclosed in the cited patent and patent applications.

A further objective of the present invention is to equip such transmissions with provisions for enhancing operational control of the transmission.

An additional objective of the present invention is to equip such transmissions with provisions selectively operable to abruptly arrest transmission output torque whenever the need arises, such as panic braking situations when such transmissions are applied in vehicular drivetrains.

To achieve these objectives, the continuously variable hydrostatic transmission of the present invention includes a housing; an input shaft journaled in the housing for receiving input torque from a prime mover; an output shaft journaled in the housing for imparting output torque to a load; a hydraulic pump unit drivingly coupled to the input shaft; a hydraulic motor unit grounded to the housing; a wedge-shaped swashplate operatively positioned between the hydraulic pump and motor units and including ports accommodating pumped hydraulic fluid transfers between the hydraulic pump and motor units, the swashplate further including diametrically opposed high and low hydraulic fluid pressure sides; a coupling pivotally connecting the swashplate to the output shaft, such that a torque acting on the swashplate is coupled to the output shaft; and a transmission ratio controller for adjusting the angular orientation of the swashplate about a pivot axis of the coupling to vary a transmission ratio of the transmission. A transmission neutral-setting hydraulic circuit is connected in fluid communication with the swashplate ports and selectively operable to substantially equalize the fluid pressures in the high and low fluid pressure sides of the swashplate, thereby reducing the torque acting on the swashplate to essentially zero, regardless of the angular orientation of the swashplate imposed by the ratio controller.

Additional features, advantages, and objectives of the invention will be set forth in the description which follows and in part will be apparent from the description, or may be learned by practice of the invention. The objectives and advantages of the present invention will be realized and attained by the continuously variable hydrostatic transmission particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

BRIEF DESCRIPTION OF THE DRAWINGS

Corresponding reference numerals refer to like parts throughout the several views of the drawings.

DETAILED DESCRIPTION OF THE PREFERRED EMBODIMENT

Figure 1:
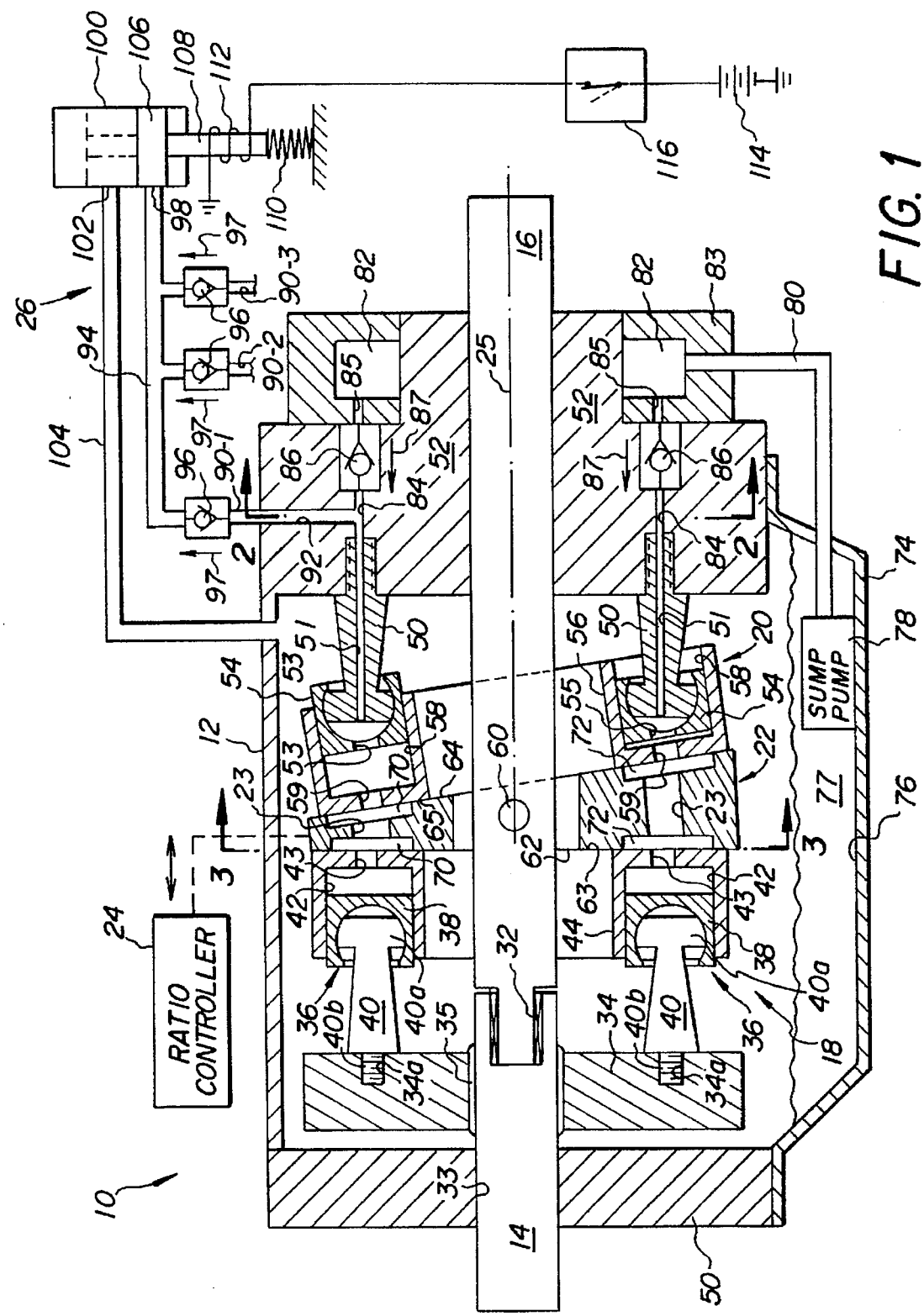
FIG. 1 is a longitudinal sectional view of a continuously variable hydrostatic transmission structured in accordance with a preferred embodiment of the present invention.

The continuously variable hydrostatic transmission according to the preferred embodiment of the present invention, generally indicated at 10 in FIG. 1, comprises, as basic components, a housing 12 in which are journaled an input shaft 14 and an output shaft 16 in coaxial, generally end-to-end relation. The end of input shaft 14 external to the housing is driving connection to a prime mover, such as a vehicular internal combustion engine (not shown), while the end of output shaft 16 external to the housing is driving connection to a load, such as vehicular driving wheels (not shown). Input shaft 14 drives a hydraulic pump unit, generally indicated at 18. A hydraulic motor unit, generally indicated at 20, is grounded to housing 12 in axially opposed relation to pump unit 18.

A wedge-shaped swashplate, generally indicated at 22, is drivingly connected to the output shaft 16 in position between the pump and motor units and is apertured, as indicated at 23, to accommodate pumped exchanges of hydraulic fluid between the pump and motor units. A ratio controller, schematically indicated at 24, is linked to swashplate 22 for the purpose of pivotally adjusting the angle of swashplate orientation relative to the output shaft axis 25, thereby adjustably setting the transmission ratio of the input shaft speed to the output shaft speed.

In accordance with a feature of the present invention, transmission 10 also includes a hydraulic circuit, generally indicated at 26, operative to abruptly establish a neutral transmission ratio condition of input to output shaft speeds (1:10), regardless of the current swashplate angle (transmission ratio) set by the ratio controller 24. Now referring to FIG. 1 in greater detail, the housing 12 includes a cover 30, secured in place by an annular array of bolts (not shown), to close off the open input end of the housing. Input shaft 14 extends into housing 12 through, and is journaled in a central opening in, the cover. The inner end of input shaft 14 is counterbored to provide a cylindrical recess for receiving a reduced diameter inner terminal portion of output shaft 16. A roller bearing ring 32, fitted in this input shaft recess, provides inner end journal support for the output shaft. The inner terminal portion of input shaft 14 extends through a bore 33 in a carrier 34 for a plurality of pistons including hydraulic pump unit 18. The input shaft and carrier bore are splined, as indicated at 35, such that the input shaft and the pump piston carrier 34 are in torque-coupled relation.

The pump pistons, for example, ten in number with two being generally indicated at 36, are uniformly distributed in a circle array concentric with output shaft axis 25 in the manner disclosed in the cited patent and patent applications. Each pump piston 36 includes a piston head 38 swivel-mounted to the free end of a mounting post 40, whose other end is machined to be threaded into a tapped hole in carrier 34. The pump piston heads 38 are slidingly received in a circle array of cylinders 42 formed in an annular cylinder block 44 surrounding output shaft 16. By virtue of the swivel mountings of pump piston heads 38 to the free ends of the axially extending posts 40, nutating motion of the pump cylinder block relative to output shaft axis 25 is accommo-dated during transmission operation described in detail in the cited U.S. patent and U.S. patent applications.

Still referring to FIG. 1, hydraulic motor unit 20 is essentially structurally equivalent to hydraulic pump unit 18. However, the hydraulic motor unit is instead grounded to housing 12 by an annular array of mounting posts 50 having machined ends threaded into tapped holes in a housing block 52. A piston head 54 is swivel mounted on the free end of each mounting post 50. A motor cylinder block 56 provides a circular array of motor cylinders 58 for respectively slidingly receiving motor piston heads 54. Since motor unit 20 is grounded to housing 12 by posts 50, the motor piston and cylinder block 56 do not rotate, however, the swivel mountings of motor piston heads 54 to posts 50 accommodate nutating (precessing) motion of the motor cylinder block during transmission operation.

As further seen in FIG. 1, output shaft 16 extends rightward through the central opening in a housing block 52 closing off the output end of the transmission 10. Swashplate 22 is drivingly connected to output shaft 16 in operative position between pump unit 18 and motor unit 20 by a transverse pin 60. The axis of pin 60, orthogonal to the output shaft axis 25, constitutes a pivot axis for swashplate 22 to accommodate transmission ratio-change adjustment of the swashplate angular orientation relative to the output shaft axis 25 by ratio controller 24. This controller is illustrated schematically, since it may take a variety of form, as seen, for example, from the cited patent and patent applications.

Figure 3:
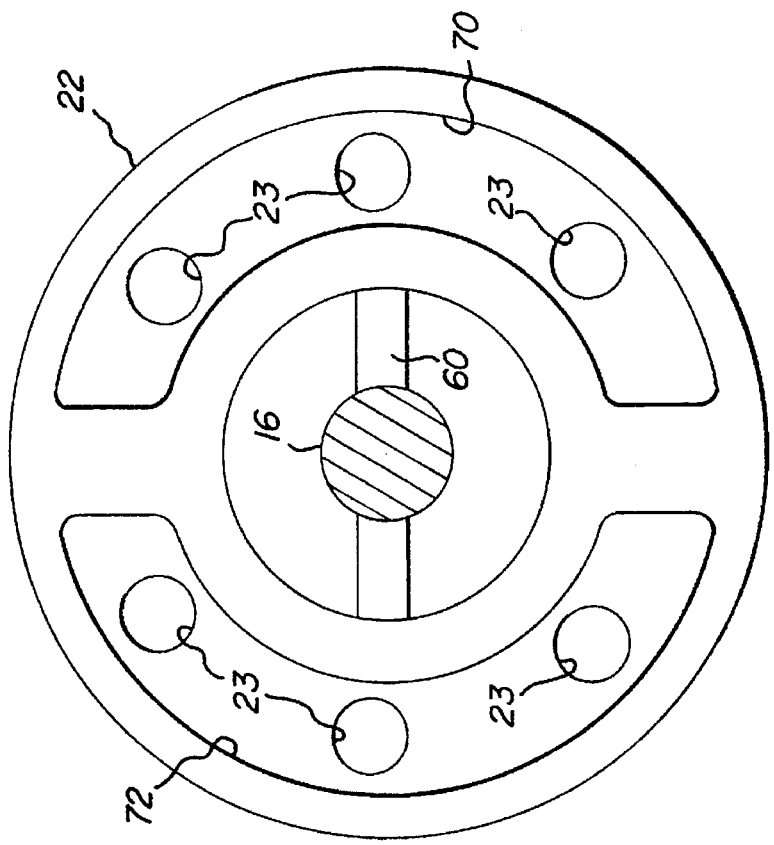
FIG. 3 is a sectional view taken along line 3—3 of FIG. 1.

Swashplate 22 includes an input face 62 in intimate sliding contact with face 63 of pump cylinder block 44 and an output face 64 in intimate sliding contact with face 65 of motor cylinder block 56. The input and output faces of swashplate 22 are relatively oriented at an acute angle to provide the wedge shape of the swashplate. Referring jointly to FIGS. 1 and 3, the swashplate input and output surfaces are formed with a pair of diametrically opposed semi-annular surface cavities 70 and 72 in axial registry. The cavities 70,70 and 72,72 are in fluid communication via swashplate ports 23. Pump cylinders 42 are in fluid communication with the cavities 70,72 in swashplate input face 62 via respective openings 43 in pump cylinder block 44, while motor cylinders 58 are in fluid communication with the cavities 70,72 in the swashplate output face 64 via openings 59 in motor cylinder block 56.

Returning to FIG. 1, a pan 74 is attached to the lower portion of housing 12 to provide a sump 76 containing hydraulic fluid 77. A sump pump 78, disposed in the sump and typically driven off the input shaft by a drive connection (not shown), pumps makeup hydraulic fluid through a line 80 to an annular chamber 82 provided in an annular channel member 83 affixed to housing block 52. Three motor piston mounting posts 50, at angular locations as close to 120° apart as possible, given the number of motor pistons, are provided with axial bores 51 that communicate with axial passages 84 in housing block 52 and passages 85 in channel member 83 opening into chamber 82. One-way check valves 86 are incorporated in housing block 52 to ensure that hydraulic make-up fluid can only flow in the direction of arrow 87 through these three fluid connections from chamber 82 through passages 85, 84, and 51 into the associated motor cylinders 58 through openings 55 in motor piston heads 54.

During transmission operation, while the pump pistons 36 and cylinders 42 revolve from the thinnest point of the wedge-shaped swashplate 22 around to its diametrically opposed thickest point, the volumes of the associated pump cylinders progressively decrease, and the hydraulic fluid therein is pressurized. This then is the high pressure or pumping side of the swashplate assumed to be occupied by axially opposed swashplate surface cavities 72, one illustrated in FIG. 3.

While the pump pistons and pump cylinders revolve from the thickest point to the thinnest point of the swashplate, the volumes of the cylinders are progressively expanded. This is considered to be the low pressure or suction side of the swashplate occupied by surface cavities 70. When the low pressure side of the swashplate is axis axially aligned with any one of the three motor positions whose mounting posts 50 include axial bores 51, the associated check valve 86 opens to permit the flow of make-up hydraulic fluid from chamber 82 into the associated motor cylinder 58, since the scavenge pumping fluid pressure of sump pump 70 exceeds the fluid pressure in the low pressure side of the swashplate. Since the three axially bored motor piston mounting posts are approximately 120° apart, at least one is always aligned with the low pressure side of the swashplate 22 to ensure that the transmission is never starved for make-up hydraulic fluid. When the axially bored motor piston mounting posts are axially aligned with the high pressure side of the swashplate, check valve 86 close, so as to isolate the low scavenge pumping fluid pressure of the sump pump 78 from the high operating fluid pressures of the transmission existing in the high pressure side of the swashplate.

Figure 2:
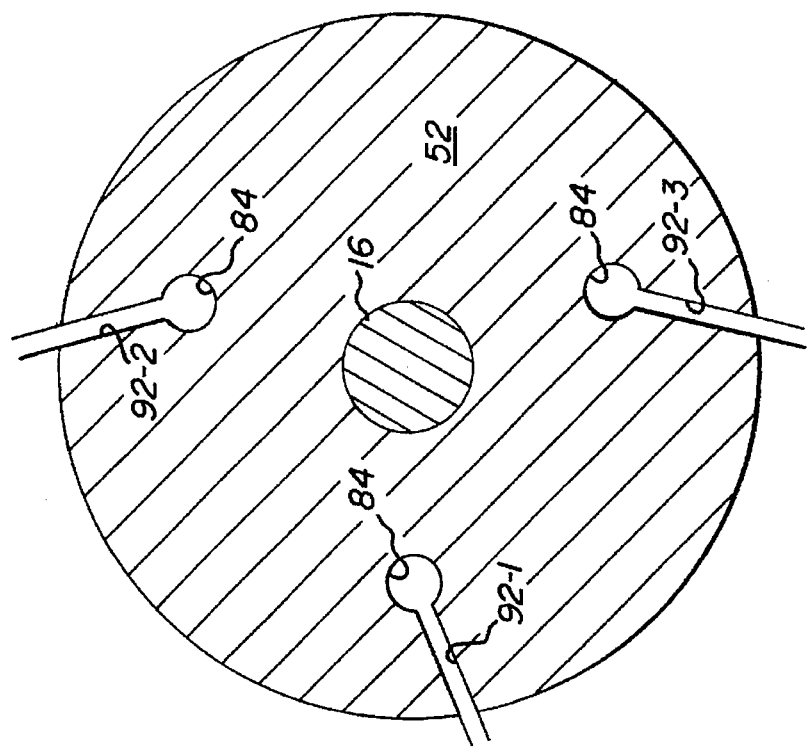
FIG. 2 is a sectional view taken along line 2—2 of FIG. 1.

Referring jointly to FIGS. 1 and 2, neutral-setting hydraulic circuit 26 includes three circuit branches 90 including three angularly spaced radial passages 92 in housing block 52 whose inner ends open respectively into the three end block axial passages 84 downstream from the check vales 86. Each of the circuit branches 90 is connected to a common fluid line 94 through a one-way check valve 96 effective to permit hydraulic fluid flow only in the direction of arrow 97. Fluid line 94 is connected to an inlet port 98 of a solenoid valve 100. The outlet port 102 of this valve is connected by a fluid line 104 back to the interior of housing 12 which is at the atmospheric pressure of sump 76.

Solenoid valve 100 includes a valve spool 106 and a plunger 108 which is acted upon by a compression spring 110 that biases the valve spool to a de-actuated position illustrated in phantom line. It is seen that, with the valve spool 106 in its phantom line de-actuated position, the valve inlet port 98 and output port 102 are unblocked, thus venting circuit branches 90 to the sump atmosphere pressure. The fluid pressures in the high and low pressure sides of swashplate 22 are then equalized at atmospheric pressure, and the hydrostatic torque components exerted on the swashplate by the hydraulic pump and motor units are reduced to essentially zero. Consequently, a neutral ratio condition is imposed on transmission 10, regardless of the transmission ratio (swashplate angle) set by controller 24. Since the transmission 10 is completely depressurized, the mechanical torque component exerted on the swashplate 22 by the rotating pump cylinder block 44 is minimal and the hydrostatic and hydromechanical torque components are essentially zero, a transmission condition (1:0 ratio) is achieved when solenoid valve 100 is in its de-actuated position.

To permit normal transmission operation, a solenoid coil 112 is wound about plunger 106 and connected into an electrical activating circuit including a current source 114 and a control module 116, which may simply be in the form of an operator-controlled switch. As long as this switch is held closed, solenoid coil 112 is energized to retract valve spool 106 to its solid line, actuated position blocking inlet port 98. The transmission can now be pressurized by the hydraulic pump and motor units to re-establish the normal operating fluid pressures in the high and low pressure sides of swashplate 22, and then output shaft 16 is again driven at the transmission ratio set by controller 24. Note that check valves 96 isolate the high and low pressure sides of the swashplate exposed to the neutral-setting hydraulic circuit 26. It will be appreciated that by providing the de-actuated position of solenoid valve 100 as the neutral-setting valve position, the neutral-setting hydraulic circuit is rendered fail-safe. That is, in the event of an electrical failure, a neutral transmission ratio setting is imposed on transmission.

While a solenoid actuated control valve is disclosed, it will be appreciated that other fluid valve types, such as a hydraulically actuated control valve may be utilized in the practice of the present invention. Also, rather than a single control valve common to all three circuit branches 90, a separate control valve could be included in each circuit branch, in which case the plural control valves would be activated and deactivated in parallel. While it is preferable to introduce the neutral-setting hydraulic circuit 26 and sump pump make-up fluid circuit into the output end of the transmission and the non-rotating hydraulic motor unit to access the high and low pressure sides of the swashplate, such access may be had via the input end of the transmission and the hydraulic pump unit. However, this alternative approach is complicated by the fact that the hydraulic pump unit is continuously rotating.

It will be apparent to those skilled in the art that various modifications and variations may be made to the continuously variable hydrostatic transmission of the present invention without departing from the spirit of the present invention. Thus, it is intended that the scope of the present invention cover modifications and variations thereof, provided they come within the spirit of the appended claims and thus equivalents.

What is claimed is:

1. A continuously variable hydrostatic transmission comprising:

a housing;

an input shaft journaled in the housing for receiving input torque from a prime mover;

an output shaft journaled in the housing for imparting output torque to a load;

a hydraulic pump unit drivingly coupled to the input shaft;

a hydraulic motor unit grounded to the housing;

a wedge-shaped swashplate operatively positioned between the hydraulic pump and motor units and including ports accommodating pumped hydraulic fluid transfers between the hydraulic pump and motor units, the swashplate further including diametrically opposed high and low hydraulic fluid pressure sides;

a coupling pivotally connecting the swashplate to the output shaft, such that torque acting on the swashplate is coupled to the output shaft; and a transmission ratio controller for adjusting an angular orientation of the swashplate about a pivot axis of the coupling to vary a transmission ratio of the transmission; and a transmission neutral-setting hydraulic circuit including at least first and second fluid circuit branches in substantially continuous alternating fluid communication with the swashplate ports in the high and low hydraulic fluid pressure sides of the swashplate and including a neutral-setting control valve selectively operable to connect the first and second fluid circuit branches to a common low fluid pressure source, whereby to substantially equalize the fluid pressures in the high and low fluid pressure sides of the swashplate, thereby reducing the torque acting on the swashplate to essentially zero, regardless of the angular orientation of the swashplate set by the ratio controller.

2. The continuously variable hydrostatic transmission defined in claim 1, further including a hydraulic fluid sump providing the common low fluid pressure source.

3. The continuously variable hydrostatic transmission defined in claim 2, further including a sump pump disposed in the sump in fluid connection with the low fluid pressure side of the swashplate.

4. The continuously variable hydrostatic transmission defined in claim 2, further comprising:
   a sump pump disposed in the sump;
   at least first and second fluid connections for substantially continuously connecting the sump pump to the low fluid pressure side of the swashplate; and
   first and second one-way check valves respectively included in the first and second fluid connections,
      wherein the first fluid circuit branch includes a third one-way check valve and is connected into the first fluid connection at a location downstream of the first check valve, and
      wherein the second fluid circuit branch includes a fourth one-way check valve and is connected into the second fluid connection at a location downstream of the second check valve.

5. A continuously variable hydrostatic transmission comprising:
   a housing;
   a hydraulic fluid sump in the housing;
   a sump pump disposed in the sump;
   an input shaft journaled in the housing for receiving input torque from a prime mover;
   an output shaft journaled in the housing for imparting output torque to a load;
   a hydraulic pump unit drivingly coupled to the input shaft;
   a hydraulic motor unit grounded to the housing;
   a wedge-shaped swashplate operatively positioned between the hydraulic pump and motor units, the swashplate including:
      diametrically opposed high and low hydraulic fluid pressure sides,
      diametrically opposed, first and second semi-annular surface cavities, the first surface cavity located in the low pressure side of the swashplate, and the second surface cavity located in the high pressure side of the swashplate, and
      ports, located in the first and second surface cavities, for accommodating pumped hydraulic fluid exchanges between the hydraulic pump and motor units;
   a coupling pivotally connecting the swashplate to the output shaft, such that torque acting on the swashplate is coupled to the output shaft;
   first, second, and third angularly spaced fluid connections for continuously providing fluid communication between the sump pump and the load pressure side of the swashplate through at least one of the first, second, and third fluid connections;
   first, second, and third one-way check valves respectively included in the first, second, and third fluid connections for interrupting the fluid communication between the sump pump and the high fluid pressure side of the swashplate;
   a transmission ratio controller for adjusting an angular orientation of the swashplate about a pivot axis of the coupling to vary a transmission ratio of the transmission; and
   a transmission neutral-setting hydraulic circuit including:
      first, second, and third fluid circuit branches respectively connected into the first, second, and third fluid connections at locations downstream from the first, second, and third check valves, such that at least one of the first, second, and third fluid circuit branches is always in fluid communication with the low pressure side of the swashplate and another one of the first, second, and third circuit branches is always in fluid communication with the high pressure side of the swashplate,
      fourth, fifth, and sixth one-way check valves respectively included in the first, second, and third fluid circuit branches, and
      a neutral-setting fluid control valve commonly connected to the first, second, and third circuit branches and selectively operable to simultaneously vent the first, second, and third circuit branches to the sump, whereby to substantially equalize the fluid pressures in the high and low pressure sides of the swashplate, and thereby reduce the torque acting on the swashplate to essentially zero, regardless of the angular orientation of the swashplate set by the ratio controller.

6. The continuously variable hydrostatic transmission defined in claim 5, wherein;
   the hydraulic pump unit includes:
      a carrier drivingly coupled for rotation by the input shaft;
      a plurality of pump pistons mounted to the carrier in a circle array by respective mounts; and
      a pump cylinder block defining a circle array of pump cylinders in which the pump pistons are respectively, slidingly received, the pump cylinder block including openings providing fluid communication between the pump cylinders and the swashplate ports;
   the hydraulic motor unit includes:
      a carrier grounded to the housing,
      a plurality of motor pistons mounted to the carrier in a circle array by respective mounts, and
      a motor cylinder block defining a circle array of motor cylinders in which the motor pistons are respectively, slidingly received, the motor cylinder including openings providing fluid communication between the motor cylinders and the swashplate ports, and three of the motor piston mounts having respective first, second, and third fluid passages respectively included in the first, second, and third fluid connections.

7. The continuously variable hydrostatic transmission defined in claim 6, wherein the fluid control valve includes an actuated valve position blocking the first, second, and third circuit branches and a de-actuated valve position venting the first, second, and third circuit branches to the sump, the neutral-setting hydraulic circuit further including an operator controller for activating the fluid control valve to the actuated valve position to permit the generation of hydrostatic torque on the swashplate and deactivating the fluid control valve to its de-actuated valve position to reduce the hydrostatic torque on the swashplate to essentially zero.

8. The continuously variable hydrostatic transmission defined in claim 7, wherein the fluid control valve is a solenoid valve, and the operator controller includes a switch for opening and closing an electrical activating circuit for the solenoid valve.

* * * * *